United States Patent Office 3,729,366
Patented Apr. 24, 1973

3,729,366
GLUTAMIC ACID POLYMER ADHERENTS
Yasuo Fujimoto, Machida, Koichi Nagaoka, Tokyo, and Keizo Tatsukawa, Machida, Japan, assignors to Kyowa Hakko Kogyo Co., Ltd., Tokyo, Japan
No Drawing. Continuation-in-part of application Ser. No. 776,809, Nov. 18, 1968, and now abandoned. This application Jan. 15, 1971, Ser. No. 106,930
Claims priority, application Japan, Nov. 22, 1967, 42/74,709
Int. Cl. B32b 27/02, 27/34
U.S. Cl. 161—89                           20 Claims

ABSTRACT OF THE DISCLOSURE

A leather-like composite comprising a coating adhesively secured to a substrate, said coating comprising a major amount of a polyglutamic acid and an adhesive containing a diisocyanato-substituted aliphatic carboxylic acid ester as the principal constituent. The adhesive used in the present invention provides a good bond between the polymeric film and the substrate surface, for example, a cotton cloth. The composite exhibits an improved luster and excellent resistance to light, as well as an enhanced elongation.

This is a continuation-in-part of pending application Ser. No. 776,809, filed Nov. 18, 1968, and now abandoned.

BACKGROUND OF THE INVENTION

The present invention relates to improved polymer adherents consisting of polymers (homo- or co-polymer or blend polymer) of glutamic acid-γ-esters with or without other amino acids. More particularly, the present invention is directed to composite comprising a coating which has an improved luster and light resistance which is provided with an improved adhesive which secures said coating to a substrate in an effective manner.

It is well known that a polymeric material consisting of a major amount of a polymer (homo- or co-polymer or blend polymer) of a glutamic acid-γ-ester with or without another amino acid (hereinafter referred to merely as polyglutamic acid) is an excellent synthetic resinous material and can be used as synthetic fibers or films. Thus, because of its chemical nature it has properties between wool and silk and, in fact, has characteristics and feel which resemble those of natural leather.

However, in utilizing the film-forming property of polyglutamic acid in producing polyglutamic acid adherents, the following problems have been encountered:

(1) There is a problem of providing sufficient adhesion between the polyglutamic acid film and the surface of substrate to be coated.

(2) Polyglutamic acid film is poor in its luster qualities.

(3) Polyglutamic acid film is low in its elongation.

An object of the present invention is to provide an improved composite of a polyglutamic acid film adhered to a substrate.

Another object of the present invention is to provide an adhesive material which produces an effective adhesion between the polyglutamic acid film and the substrate to be coated.

A further object of the present invention is to provide a polyglutamic acid film which possesses good luster and light resistance properties and an improved elongation.

Other objects and further scope of applicability of the present invention will become apparent from the detailed description given herein after; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved composite containing a polyglutamic acid film may be obtained by using a urethane resin as an adhesive for adhering the polyglutamic acid coating or film to the desired substrate. According to the present invention, it has been found that a urethane resin comprising as its principal constituent a diisocyanato substituted alkanoic acid ester having the following formula:

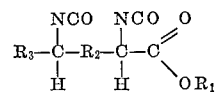

wherein $R_1$ can be, either unsaturated or saturated, alkyl, alkoxyalkyl, cycloalkyl, aryl, alkaryl or aralkyl, either unsubstituted or substituted with halogen, nitro, alkoxy, carboalkoxy, acylamino, dialkylamino, carboalkoxyamino (alkoxycarbonylamino) or carboaralkoxyamino (aralkoxycarbonylamino) radicals, $R_2$ is alkylene or alkylidene, $R_3$ is hydrogen or a radical having the following formula:

wherein Y can be, either unsaturated or saturated, alkyl, alkoxyalkyl, cycloalkyl, aryl, alkaryl or aralkyl, either unsubstituted or substituted with halogen, nitro, alkoxy, carboalkoxy, acylamino, dialkylamino, carboalkoxyamino (alkoxycarbonylamino) or carboaralkoxyamino (aralkoxycarbonylamino) radicals, exhibits excellent compatibility (co-dissolubility) with polyglutamic acid. It has been further found that when using said urethane resin as an adhesive for polyglutamic acid, not only is the adhesiveness referred to above substantially improved but also, and unexpectedly, the luster of the polyglutamic acid film is markedly enhanced. The ester of alkanoic acid diisocyanate used as the adhesive in the present invention can be obtained by phosgenating an ester of the corresponding α,ω-diaminoalkanoic acid.

According to the present invention it has been found that glutamic acid polymer adherents, in which the above-mentioned type of urethane resins are used as adhesives, possess excellent light-resistance and thus it is convenient to produce therefrom final products having light or pale shades such as a white color, a yellow color, and the like. Thus, in the case of producing colored polyglutamic acid adherents (coatings or films), products having clear colors can be readily obtained.

In order to improve the elongation of the polyglutamic acid adherent, it is advantageous to add to said polyglutamic acid adherent a plasticizer which exhibits excellent compatibility with said polyglutamic acid. Suitable plasticizers include diesters of amino acids and derivatives thereof. Plasticizers which are compatible with polyglutamic acid are discussed in U.S. patent application Ser. No. 761,853, filed Sept. 23, 1968, and now abandoned.

As stated above, the particular urethane resins which are used as the adhesive for the glutamic acid polymer films according to the present invention are alkanoic acid diisocyanate esters. Although any of the commercially available compounds can be used, the following compounds are typical; the esters of 2,6-diisocyanato carproic acid (lysine diisocyanate), 2,4-diisocyanato butyric acid, 2,5-diisocyanato valeric acid, 2,7-diisocyanato acid and 2,8-diisocyanato caprylic acid such as the methyl, ethyl, n-propyl, i-propyl, n-butyl and isomers thereof, n-pentyl and isomers thereof, n-hexyl and isomers thereof, n-octyl and isomers thereof, n-decyl and isomers, n-dodecyl and isomers, stearyl, palmityl, methoxymethyl, ethoxymethyl, 2-methoxyethyl, 2-ethoxyethyl, 2-propoxyethyl, 2-butoxyethyl, 3-methoxypropyl, 3-ethoxypropyl, 4-methoxybutyl, 4-ethoxybutyl, phenyl, benzyl, o-tolyl, p-tolyl, phenylethyl, p-tolylmethyl, o-tolylmethyl, o-(2-chlorotolyl), 2-chloroethyl, 2-bromoethyl, 2-chloropropyl, 3-chloropropyl, 1,2-dichloropropyl, 2,3-dichloropropyl, cyclobutyl, cyclopentyl, cyclohexyl, cycloheptyl, cyclooctyl, cyclodecyl, cyclopentylmethyl, cyclohexylmethyl and cyclobutylmethyl esters; the homo- or hetero-diesters of 2,4-diisocyanato glutaric acid, 2,5-diisocyanato adipic acid, 2,6-diisocyanato pimelic acid, 2,7-diisocyanato suberic acid and 2,9-diisocyanato sebacic acid such as dimethyl, diethyl, dipropyl (di-n-propyl and di-i-propyl), dibutyl and isomers, dioctyl and isomers, didecyl and isomers, didodecyl, distearyl, diphenyl, dibenzyl, di(o-tolyl), di(p-tolyl), di(β-phenylethyl), di(p-tolylmethyl) di[o - (2 - chlorotolyl)], di(2-chloroethyl), di(2-chloropropyl), di(2,3-dichloropropyl), di(methoxymethyl), di(2-methoxyethyl), di(2-ethoxyethyl), di(2-propoxyethyl), di(2-butoxyethyl), di(cyclohexyl), and di(cyclopentyl) diesters and mixed esters such as methyl-ethyl, methyl-propyl, methyl-butyl, ethyl-propyl, ethyl-butyl, n-propyl-i-propyl, propyl-butyl, phenyl-octyl, benzyl-stearyl, and methyl-benzyl diesters. The diisocyanate may be either optically active or inactive. The diisocyanates preferred for use are the alkyl esters of 2,4-diisocyanato valeric acid and 2,6-diisocyanato caproic acid.

Typical of the ester group represented by the $R_1$ and Y are; methyl, ethyl n-propyl, i-propyl, n-butyl and isomers thereof, n-pentyl and isomers thereof, n-hexyl and isomers thereof, n-heptyl and isomers thereof, n-octyl and isomers thereof, n-decyl and isomers thereof, n-dodecyl (lauryl) and isomers thereof, cetyl, stearyl, oleyl, cyclobutyl, cyclopentyl, cyclohexyl, cycloheptyl, cyclooctyl, cyclobutylmethyl, cyclopentylmethyl, cyclohexylmethyl, cyclooctylmethyl, methcyclohexyl, phenyl, o-tolyl, p-tolyl, benzyl, β-phenylethyl, p-tolylmethyl, o-tolylmethyl, o-(2-chlorotolyl), methoxymethyl, ethoxymethyl, 2-nitroethyl, 2-chloroethyl, 2-bromoethyl, 2-fluoroethyl, 2-cyanoethyl, 2-chloropropyl, 3-chloropropyl, 1,2-dichloropropyl, 2,3-dichloropropyl, 3-bromopropyl, vinyl, allyl, crotyl, p-chlorobenzyl, p-bromobenzyl, p-fluorobenzyl, p-nitrobenzyl, p-cyanobenzyl, p-methoxybenzyl, o-carboethoxybenzyl, p - carboethoxybenzyl, p - carbomethoxybenzyl, pentachlorobenzyl, o-methoxybenzyl, o- or p-ethoxybenzyl, o- or p-methoxyphenyl, p-chlorophenyl, p-nitrophenyl, pentachlorophenyl, p-carbomethoxyphenyl, p-(N-methylaminophenyl), p-(N-ethylaminophenyl), p - (N,N - dimethylaminophenyl), p-(N,N-diethylaminophenyl), p-(N-methyl-N-ethylaminophenyl), p-(N-methylaminobenzyl), p-(N-acetylaminophenyl), p-(N - acetylaminobenzyl), p-(N-carbomethoxyaminophenyl), p - (N - carbomethoxyaminobenzyl), β-(dimethylaminoethyl), β-(carboethoxyethyl), and p-(N-carbobenzoxyaminophenyl), 2-methoxyethyl, 2-ethoxyethyl, 3-methoxypropyl, 3-ethoxypropyl, 3-butoxypropyl, 4-methoxybutyl, 4-ethoxybutyl, and 2-butoxyethyl.

In preparing urethane resin adhesive containing the diisocyanato alkanoic acid esters as the main ingredient thereof, the technique for preparing urethane resin adhesives containing tolylenediisocyanate or hexamethylenediisocyanate as starting materials can be effectively used with these compounds as starting materials. The adhesive of the present invention can also be used as a moisture cured adhesive in the form of a one-component type adhesive or a two-component urethane adhesive when used together with a polyol, a polyolpolyester, an acrylic-modified polyol, and the like. In the case of employing the adhesive as a two-component type adhesive, it is possible to prepare a soft, medium-hard and hard adhesive by merely selecting the kind of polyols to be employed. The type of adhesive utilized depends upon the particular uses to which it is to be subjected.

The surface of substrates to which the polyglutamic acid can be adhered according to the present invention include any substrates to which a urethane resin adhesive can be applied. Typical substrates include woven fabrics and knitted fabrics made of polyamide fibers, polyester fibers, polyacrylonitrile fibers, polyvinyl chloride fibers, regenerated fibers such as viscose and acetate, natural fibers such as cotton, silk, linen, wool, and the like; fibrous substrates such as paper, non-woven fabrics, and textile mats, plate-like and sheet-like articles of various substrates, the surfaces of which are coated with a synthetic resin such as a polyamide resin (nylon 6 and the like), a polyurethane resin, a polyester resin (alkyd resin) and polyvinyl chloride, and plate-like articles of wood or metals such as iron and aluminum. Cotton substrates are preferred.

Although the homo- or co-polymers or blend polymers of any kind of glutamic acid γ-esters with or without other amino acids or derivatives thereof which are commonly used in the field of amino acid or peptide chemistry, wherein the glutamic acid γ-esters have the following formulae:

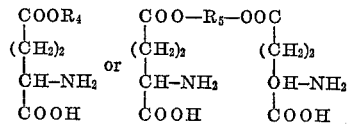

including those which are either optically active or optically inactive can be used as the film or adherent according to the present invention, it is more desirable to use the homo- or copolymers or blend polymers wherein the glutamic acid γ-ester or γ-esters having an $R_4$ or $R_5$ group selected from the following residues are a major component: a mono- or di-valent hydrocarbon residue consisting of a saturated or unsaturated aliphatic hydrocarbon residue having 1 to 20 carbons, a saturated or unsaturated cycloaliphatic hydrocarbon residue having 4 to 20 carbons, an aromatic hydrocarbon residue having 6 to 20 carbons including aryl, arylene, alkaryl, alkarylene, aralkyl, aralkenyl, aralkylene, and aralkenylene, and a residue belonging in the above-mentioned types of hydrocarbons having a substituent or substituents selected from the group consisting of chloro, bromo, fluoro, nitro, cyano (nitrile), alkoxy, carboalkoxy, carboaryloxy, carboalkaryloxy, carboaralkoxy, mono- and di-alkylated amino, acylated amino, carboalkoxyamino and carboaralkoxyamino.

Typical of ester groups represented by $R_4$ are: methyl, ethyl, n-propyl, i-propyl, n-butyl and isomers thereof, n-pentyl and isomers thereof, n-hexyl and isomers thereof, n-heptyl and isomers thereof, n-octyl and isomers thereof, n-decyl and isomers thereof, n-dodecyl (lauryl) and isomers thereof, cetyl, stearyl, oleyl, cyclobutyl, cyclopentyl, cyclohexyl, cycloheptyl, cyclooctyl, cyclobutylmethyl, cyclopentylmethyl, cyclohexylmethyl, cyclooctylmethyl, methylcyclohexyl, phenyl, o-tolyl, p-tolyl, benzyl, β-phenylethyl, p-tolylmethyl, o-tolylmethyl, o-(2-chlorotolyl), methoxymethyl, ethoxymethyl, 2-nitroethyl, 2-chloroethyl, 2-bromoethyl, 2-fluoroethyl, 2-cyanoethyl, 2-chloropropyl, 3-chloropropyl, 1,2-dichloropropyl, 2,3-dichloropropyl, 3-bromopropyl, vinyl, allyl, crotyl, p-chlorobenzyl, p-bromobenzyl, p-fluorobenzyl, p-nitrobenzyl, p-cyanobenzyl, p-methoxybenzyl, o-carboethoxybenzyl, p-carboethoxybenzyl, p-carbomethoxybenzyl, pentachlorobenzyl, o-methoxybenzyl, o- or p-ethoxybenzyl, o- or p-methoxyphenyl, p-chlorophenyl, p-nitrophenyl, pentachlorophenyl, p-carbomethoxyphenyl, p-(N-methylaminophenyl), p-(N-ethylaminophenyl), p-(N,N-dimethylaminophenyl), p - (N,N - diethylaminophenyl), p-(N-methyl-N-ethylaminophenyl), p-(N-methylaminobenzyl), p-(N-acetylaminophenyl), p-(N-acetylaminobenzyl), p-carbomethoxyaminophenyl), p-(N-carbomethoxyaminobenzyl), β-(dimethylaminoethyl), β-carboethoxyethyl), p-(N-carbobenzoyaminophenyl), 2-methoxyethyl, 2-ethoxyethyl, 3-methoxypropyl, 3-ethoxypropyl, 3-butoxypropyl, 4-methoxybutyl, 4-ethoxybutyl, 2-butoxyethyl, and those for $R_5$ are ethylene, propylene, trimethylene, tetramethylene, pentamethylene, hexamethylene, 2-butenylene, cyclopentylene, cyclohexylene, cyclohexenylene, p-phenylene, and residues derived from p-di(hydroxymethyl) benzene, p-di(hydroxymethyl) cyclohexane, diethylene glycol and dipropylene glycol.

Although any kind of other amino acids or derivatives thereof consisting of, for example, neutral amino acids, acidic amino acid ω-mono esters and $N^\alpha$-substituted derivatives of basic amino acids, including either optically active or inactive forms, can be used with the glutamic acid γ-ester or esters as the component in the said polymers, it is more desirable to use glycine, alanine, α-aminobutyric acid, valine, norvaline, leucine, isoleucine, norleucine, phenylalanine, O-substituted serine, O-substituted homoserine, O-substituted threonine, S-substituted cysteine, cystine, methionine, asparatic, acid-β-monoester, α-aminoadipic acid-δ-monoester, $N^{im}$-substituted histidine, proline, $N^\delta$-substituted ornithine, $N^\epsilon$-substituted lysine, or $N^{guanido}$-substituted arginine.

Typical examples of polymers are: homopolymers such as poly-γ-methyl glutamate, poly-γ-ethyl glutamate, poly-γ-(i-propyl) glutamate, poly-γ-(n-propyl) glutamate, poly-γ-(n-butyl) glutamate, poly-γ-(i, sec- or t-butyl) glutamate, poly-γ-benzyl glutamate, polyamide polymer of $O^1$, $O^2$-di(γ-glutamyl) ethylene glycol [ethylene glycol di(γ-glutamate)], polyamide polymer of $O^1$, $O^3$-di(γ-glutamyl) trimethylene glycol [trimethylene glycol di(γ-glutamate)], polyamide polymer of $O^1$, $O^4$-di(γ-glutamyl) tetramethylene glycol [tetramehylene glycol di(γ-glutamate)] and polyamide polymer of $O^1$, $O^6$-di(γ-glutamyl) hexamethylene glycol [hexamethylene glycol di(γ-glutamate)]; copolymers such as copoly-γ-methyl glutamate-γ-ethyl glutamate,
copoly-γ-methyl glutamate-γ-(n-propyl) glutamate,
copoly-γ-methyl glutamate-γ-(i-propyl) glutamate,
copoly-γ-methyl glutamate-γ-(n-butyl) glutamate,
copoly-γ-methyl glutamate-γ-benzyl glutamate,
copoly-γ-methyl glutamatealanine,
copoly-γ-methyl glutamate-$N^\epsilon$-acetyllysine,
copoly-γ-methyl glutamate-methionine,
copoly-γ-methyl glutamate-γ-ethyl glutamate-γ-(n-propyl) glutamate,
copoly-γ-mehtyl glutamate-γ-ethyl glutamate-γ-(i-propyl) glutamate,
copoly-γ-mehtyl glutamate-γ-ethyl glutamate-γ-butyl glutamate,
copoly-γ-methyl glutamate-alinine-methionine and
coply-γ-methyl glutamate-ethylene glycol di(γ-glutamate) [$O^1$, $O^2$-di(γ-glutamyl) ehylene glycol] γ-(i-propyl) glutamate;

blend polymers such as blend polymers of poly-γ-methyl glutamate and poly-γ-ethyl glutamate, blend polymers of poly-γ-methyl glutamate and poly-γ-(n-propyl) glutamate, blend polymers of poly-γ-methyl glutamate and poly-γ-(i-propyl) glutamate, blend polymers of poly-γ-methyl glutamate and poly-γ-(n-butyl) glutamate, blend polymers of poly-γ-methyl glutamate, poly-γ-ethyl glutamate and poly-γ-(n-butyl) glutamate, blend polymers of poly-γ-methyl glutamate and poly-γ-benzyl glutamate, blend polymers of poly-γ-methyl glutamate and polyalanine, blend polymers of poly-γ-methyl glutamate, poly-γ-ethyl glutamate and polyalanine, blend polymers of poly-γ-mehtyl glutamate and poly-$N^\epsilon$-acetyllysine, blend polymers of poly-γ-methyl glutamate, polyamide polymers of $O^1$, $O^2$-di(γ-glutamyl) ethylene glycol [ethylene glycol di(γ-glutamate)] and polyalanine, blend polymers of poly-γ-methyl glutamate, polyamide polymer of $O^1$, $O^3$-di(γ-glutamyl) trimethylene glycol and poly-γ-butyl glutamate, blend polymers of poly-γ-methyl glutamate, polyalanine and polymethionine, blend polymers of poly-γ-methyl glutamate and polymethionine, blend polymers of poly-γ-methyl glutamate, polyalanine and poly-N-acetyllysine, blend polymers of poly-γ-ethyl glutamate and poly-γ-(n-butyl) glutamate, blend polymers of poly-γ-ethyl glutamate and poly-γ-(n-propyl) glutamate, blend polymers of poly-γ-ethyl glutamate and poly-γ-(i-propyl) glutamate, blend polymers of poly-γ-ethyl glutamate and polyalanine, blend polymers of poly-γ-ethyl glutamate and poly-$N^\epsilon$-acetyllysine, and blend polymers of poly-γ-ethyl glutamate and polymethionine.

The curing temperature of the urethane resin adhesive used in the present invention, which comprises the ester of diisocyanato alkanoic acid as the main ingredient thereof, is preferably from about room temperature to 180° C. As the urethane resin adhesive of the present invention, those having a ratio of the said diisocyanate to polyol of about 0.1 to 10.0 in terms of the NCO/OH ratio is desirable. Particularly advantageous is the ratio of about 0.5 to 3.0.

The following examples are given merely as being illustrative of the present invention and accordingly are not to be considered as limiting. The parts noted therein are by weight.

EXAMPLE 1

A urethane resin adhesive of the moisture cured type comprising 59 parts of the trimethylolpropane adduct of lysine diisocyanate methyl ester (molar ratio 3:1), 5.9 parts of a 10% cellulose acetate butyrate solution in a Cellosolve acetate (trademark, Union Carbide Corporation)-xylene mixture (weight ratio 1:1), 0.6 part of dibutyl tin dilaurate and 120 parts of a Cellosolve acetate-xylene mixture (weight ratio 1:1) is prepared. A conventional urethane foam leather comprising cotton suede as the substrate cloth is coated with the aforesaid urethane resin adhesive so as to form thereon a layer of 10 g./m.² in terms of solid weight. A greater part of the solvent is purged off at 40° C. to initiate the curing reaction of the urethane resin adhesive. The resultant product is then coated with a dichloroethane (ethylene dichloride) solution of poly-γ-methyl-L-glutamate (polymer content: 10% by weight, molecular weight of polymer: 350,000) to form thereon a layer of 9 g./m.² in terms of solid weight, and the solvent is purged off at 40° C. to obtain a lustrous synthetic leather, the surface of which is coated with poly-γ-methyl-L-glutamate. Peeling at the face of adhesion of the synthetic leather is not possible.

EXAMPLE 2

A urethane resin adhesive comprising 45 parts of a mixed solution (containing 80% by weight of non-volatile substances) of the trimethylolpropane adduct of lysine diisocyanate methyl ester (molar ratio 3:1) and a Cellosolve acetate-xylene mixture (weight ratio 1:1), 32 parts of a polyphthalic ester polyether mixture (average OH value: 104) containing polypropylene glycol polyether having a molecular weight of 3000 as the main ingredient, and 100 parts of a mixed solvent of Cellosolve acetate-xylene (weight ratio 1:1) is prepared.

The surface of a thin plate-like article coated with polyvinyl chloride which comprises a textile fabric as the substrate cloth, is coated with the aforesaid adhesive to form thereon a layer of 20 g./m.² in terms of solid weight. After purging off the solvent therefrom, the resultant coated product is adhered with a 0.02 mm. thick film of poly-γ-methyl-L-glutamate and pressed to obtain a lustrous synthetic leather, the surface of which is coated with poly-γ-methyl-L-glutamate. Peeling at the face of adhesion in the thus obtained synthetic leather does not occur.

EXAMPLE 3

A urethane resin adhesive comprising 19.0 parts of a mixed solution (containing 80% by weight of non-volatile substances) containing the trimethylolpropane adduct of lysine diisocyanate methyl ester (molar ratio 3:1) and Cellosolve acetate-xylene (weight ratio 1:1), 22.5 parts of Desmophen-1200 (trade name), 1.2 parts of N-methyldiethanolamine, 3.9 parts of cellulose acetate butyrate and 50.7 parts of mixed solvent of Cellosolve acetate-xylene (weight ratio 1:1) is prepared.

A clean surface of an iron plate is coated with the aforesaid adhesive so as to form thereon a layer of 10 g./m.$^2$ in terms of solid weight. After purging off the solvent therefrom, the resultant coated product is coated with a suspending solution comprising, as the main ingredient, a 1,2-dichloroethane (ethylene dichloride) solution of poly-γ-methyl-L-glutamate (polymer content: 15% by weight and polymer molecular weight: about 300,000) colored with titanium oxide, to form thereon a layer of 10 g./m.$^2$ in terms of the polymer weight. The solvent is purged off at 40° C. therefrom, and curing of the polyurethane adhesive is completed to obtain a coated face having a beautiful white color. The thus obtained coated face is allowed to stand in a Fade-O-Meter and Weather-O-Meter for 200 hours, respectively. In each case, no discoloration is observed.

EXAMPLE 4

A non-woven fabric consisting of 50% of cotton and 50% of rayon staple is coated with the same urethane adhesive as in Example 2, to form thereon a layer of 30 g./m.$^2$ in terms of solid weight. When the layer is semi-dried, the coated fabric is further coated with a mixed liquid comprising 90 parts of poly-γ-methyl-L-glutamate (molecular weight: about 360,000), 6 parts of di-butyl N-acetyl-glutamate and 904 parts of ethylene dichloride, to form thereon a layer of 80 g./m.$^2$. The resultant coated product is dried to obtain a synthetic leather very closely resembling natural leather, having an improved luster and elongation. Peeling at the face of adhesion in the thus-obtained synthetic leather is not possible.

EXAMPLES 5–31

The procedure used in the foregoing Example 1 is followed using the urethane resin adhesive comprising the components indicated in the following tables and the polymer solution indicated in the following tables. In each case, the resulting product retains its improved properties such as luster, leather-touch (feeling), strong adhesion and non-yellowing upon prolonged exposure to strong U.V. light.

TABLE

| Ex. No. | Urethane component (parts by weight shown in parentheses) | Polymer component |
|---|---|---|
| 5 | 1. Adduct of 2,5-diisocyanato methyl valerate (83.0), glycerol (10.0) and ethylene glycol (7.0).<br>2. Ethylene glycol acetate butyrate (Trade name) (6.0).<br>3. Dibutyl tin dilaurate (0.3).<br>4. Triethylamine (0.3).<br>5. Methyl Cellosolve acetate (trademark, Union Carbide Corporation)-xylene (1:1) (160). | Poly-γ-ethyl-L-glutamate (M.W. 300,000).<br>Do.<br>Do.<br>Do.<br>Do. |
| 6 | 1. Adduct of 2,5-diisocyanato ethyl valerate (80.0), hexanetriol-1,2,6 (14.0) and polypropylene glycol (M.W. 1,000) (20.0).<br>2. Propylene glycol acetate (10.0).<br>3. Dibutyl tin dilaurate (0.5).<br>4. Petroleum benzine (100). | Poly-γ-(n-butyl)-D-glutamate (N.W. 210,000).<br>Do.<br>Do.<br>Do. |
| 7 | 1. Adduct of 2,5-diisocyanato n-propyl valerate (85.0) and pentaerythritol (9.0).<br>2. Ethylene glycol acetate (8.0).<br>3. Dibutyl tin dilaurate (0.6).<br>4. N-methyldiethanolamine (0.6).<br>5. Ethyl Cellosolve propionate (trademark, Union Carbide Corporation)-toluene (1:1) (120). | Poly-γ-(i-propyl)-L-glutamate (M.W. 240,000).<br>Do.<br>Do.<br>Do.<br>Do. |
| 8 | 1. Adduct of 2,6-diisocyanato butyl caproate (85.0), glycerol (7.5) and butylene glycol-1,3 (3.0).<br>2. Silicone XL 520 (trademark) (0.2).<br>3. Dibutyl tin dilaurate (0.4).<br>4. N-ethyldiethanolamine (0.5).<br>5. Ethyl Cellosolve acetate (trademark, Union Carbide Corporation)-xylene (1:1) (110). | Poly-γ-benzyl-L-glutamate (M.W. 470,000).<br>Do.<br>Do.<br>Do.<br>Do. |
| 9 | 1. Adduct of 2,6-diisocyanato β-methoxyethyl caproate (75.0) and trimethylolpropane (10.0).<br>2. Cellulose acetate butyrate (6.0).<br>3. Dibutyl tin laurate (0.6).<br>4. N-methyldiethanolamine (0.6).<br>5. Butyl Cellosolve acetate (trademark, Union Carbide Corporation)-xylene (1:1) (100). | Copolymer (M.W. 250,000) of γ-methyl-D-glutamate and γ-ethyl-D-glutamate (7:3).<br>Do.<br>Do.<br>Do.<br>Do. |
| 10 | 1. Adduct of 2,6-diisocyanato γ-chloropropyl caproate (68.0), trimethylolpropane (10.0) and polypropylene glycol (M.W. 410) (25.0).<br>2. Ethylene glycol acetate (6.5).<br>3. Dibutyl tin dilaurate (0.3).<br>4. Methyl Cellosolve acetatexylene (1:1) (100). | Poly-γ-chloroethyl-L-glutamate (M.W. 230,000).<br>Do.<br>Do.<br>Do. |
| 11 | 1. Adduct of 2,6-diisocyanato β-bromoethyl valerate (75.0) and trimethylolpropane (11.0).<br>2. Dibutyl tin dilaurate (0.4).<br>3. Triethylamine (0.4).<br>4. Ethylene glycol acetate-xylene (1:1) (120). | Copolymer (M.W. 270,000) of γ-methyl-L-glutamate and L-alanine (8:2).<br>Do.<br>Do.<br>Do. |
| 12 | 1. Adduct of 2,6-diisocyanato ethyl caproate (60.0), trimethylolpropane (8.5), butylene glycol-1,3 (2.8) and polypropylene glycol (M.W. 1,000) (33.0).<br>2. Dibutyl tin dilaurate (0.3).<br>3. Ethylene glycol acetatexylene (1:1) (100). | Poly-γ-2-methoxyethyl-L-glutamate (M.W. 280,000).<br>Do.<br>Do. |
| 13 | 1. Adduct of 2,6-diisocyanato n-octyl caproate (85.0), pentaerythritol (8.5) and hexamethylene glycol-1,6 (16.0).<br>2. Cellulose acetate butyrate (6.0).<br>3. N-methyldiethanol amine (0.5).<br>4. Methyl Cellosolve acetatexylene (1:1) (100). | Poly-γ-chlorobenzyl-D-glutamate (M.W. 310,000).<br>Do.<br>Do.<br>Do. |
| 14 | 1. Adduct of 2,6-diisocyanato hexyl caproate (85.0) and trimethylolpropane (12.5).<br>2, 3 and 4. Same as in Example 13. | Polyamide polymer of O$^1$, O$^2$-di(γ-glutamyl) ethylene glycol (M.W. 220,000).<br>Do. |
| 15 | 1. Adduct of 2,6-diisocyanato n-decyl caproate (80.0) and pentaerythritol (8.0).<br>2, 3 and 4. Same as in Example 13. | Copolymer (M.W. 300,000) of γ-methyl-L-glutamate and γ-(i-propyl)-L-glutamate (8:2).<br>Do. |

TABLE—Continued

| Ex. No. | Urethane component (parts by weight shown in parentheses) | Polymer component |
|---|---|---|
| 16 | 1. Adduct of 2,6-diisocyanato dodecyl caproate (75.0), trimethylol propane (11.0) and polypropylene glycol (M.W. 2,000) (30.0).<br>2, 3, 4 and 5. Same as in Example 8 | Copolymer (M.W. 250,000) of $\gamma$-methyl-L-glutamate and $\gamma$-butyl-L-glutamate (9:1).<br>Do. |
| 17 | 1. Adduct of 2,6-diisocyanato stearyl caproate (75.0), glycerol (7.0) and butanediol 1,4 (7.0).<br>2, 3, 4 and 5. Same as in Example 8 | Copolymer (M.W. 320,000) of $\gamma$-methyl-L-glutamate and $\gamma$-methoxyethyl-L-glutamate (7:3).<br>Do. |
| 18 | 1. Adduct of 2,6-diisocyanato phenyl caproate (70.0), 1,2,6-hexanetriol (10.0) and polypropylene glycol (M.W. 2,000) (25.0).<br>2, 3, 4 and 5. Same as in Example 8 | Copolymer (M.W. 250,000) of $\gamma$-ethyl-L-glutamate and $\gamma$-(n-butyl)-L-glutamate (8:2).<br>Do. |
| 19 | 1. Adduct of 2,6-diisocyanato benzyl caproate (70.0), pentaerythritol (8.0) and polyethylene glycol (M.W. 1,500) (30.0).<br>2, 3, 4 and 5. Same as in Example 8 | Copolymer (M.W. 330,000) of $\gamma$-methyl-D-glutamate and $\gamma$-benzyl-D-glutamate (9:1).<br>Do. |
| 20 | 1. Adduct of 2,7-diisocyanato methyl heptanoate (80.0) and trimethylol propane (14.0).<br>2, 3, 4 and 5. Same as in Example 5 | Copolymer (M.W. 260,000) of $\gamma$-methyl-L-glutamate and N$\epsilon$-acetyl-D-lysine (9:1).<br>Do. |
| 21 | 1. Adduct of 2,8-diisocyanato methyl caprylate (80.0) and trimethylol propane (14.0).<br>2, 3, 4 and 5. Same as in Example 5 | Copolymer (M.W. 350,000) of $\gamma$-methyl-D-glutamate anp D-methionine (8:2).<br>Do. |
| 22 | 1. Adduct of 2,7-diisocyanato ethyl heptanoate (80.0) and trimethylol propane (14.0).<br>2, 3, 4 and 5. Same as in Example 5 | Blend polymer of poly-$\gamma$-methyl-L-glutamate (M.W 450,000) and poly-$\gamma$-(n-propyl) glutamate (M.W. 300,000) (8:2).<br>Do. |
| 23 | 1. Adduct of 2,6-diisocyanato sec-butyl-caproate (80.0) and trimethylol propane (15.0).<br>2, 3, 4 and 5. Same as in Example 5 | Blend polymer of poly-$\gamma$-methyl-L-glutamate (M.W. 410,000) and poly-$\gamma$-(t-butyl) L-glutamate (M.W. 300,000). (9:1).<br>Do. |
| 24 | 1. Adduct of 2,4-diisocyanato dimethyl glutarate (60.0), trimethylol propane (10.0) and polypropylene glycol (M.W. 1,000) (20.0).<br>2, 3, 4 and 5. Same as in Example 5 | Blend polymer of poly-$\gamma$-methyl-L-glutamate (M.W 260,000) and poly-$\gamma$-(n-butyl) glutamate (M.W. 230,000) (8:2).<br>Do. |
| 25 | 1. Adduct of 2,5-diisocyanato diethyl adipate (60.0), trimethylol propane (10.0) and polypropylene glycol (M.W. 1,000) (20.0).<br>2, 3, 4 and 5. Same as in Example 5 | Blend polymer of poly-$\gamma$-methyl-L-glutamate (M.W 260,000) and poly-D-alanine (M.W. 380,000) (7:3).<br>Do. |
| 26 | 1. Adduct of 2,6-diisocyanato methyl-ethyl pimelate (70.0), trimethylol propane (10.0) and polypropylene glycol (M.W. 1,000) (20.0).<br>2, 3, 4 and 5. Same as in Example 5 | Blend polymer of poly-$\gamma$-ethyl-D-glutamate (M.W. 280,000) and poly-D-methionine (M.W. 400,000) (8:2).<br>Do. |
| 27 | 1. Adduct of 2,9-diisocyanato dimethyl sebacate (75.0), trimethylol propane (10.0) and polypropylene glycol (M.W. 1,000) (20.0).<br>2, 3, 4 and 5. Same as in Example 5 | Blend polymer of poly-$\gamma$-ethyl-L-glutamate (M.W. 320,000) and poly-L-N$\epsilon$-acetyl-L-lysine (M.W. 250,000) (9:1).<br>Do. |
| 28 | 1. Adduct of 2,5-diisocyanato dibutyl adipate (70.0) and reaction product of 3 moles propylene oxide with 1 mole trimethylol propane (Dow Chem. Co. triol designated Varanol OP 260) (33.0).<br>2, 3, 4 and 5. Same as in Example 5 | Blend polymer of poly-$\gamma$-methyl-D-glutamate(M.W 320,000) and poly-$\gamma$-benzyl-D-glutamate (M.W. 380,000) (9:1).<br>Do. |
| 29 | 1. Adduct of 2,5-diisocyanato dipropyl adipate (70.0) and trimethylol propane (10.0).<br>2, 3, 4 and 5. Same as in Example 8 | Blend polymer of poly-$\gamma$-methyl-L-glutamate (M.W 410,000) and polyamide polymer of $O^1$, $O^3$-di ($\gamma$-L-glutamyl) trimethylene glycol [trimethylene glycol di ($\gamma$-L-glutamate)] (M.W. 250,000) (8:2).<br>Do. |
| 30 | 1. Adduct of 2,6-diisocyanato dihexyl pimelate (70.0) and trimethylol propane (10.0).<br>2, 3, 4 and 5. Same as in Example 8 | Poly-$\gamma$-methyl-L-glutamate (M.W. 480,000).<br>Do. |
| 31 | 1. Adduct of 2,6-diisocyanato dibenzyl pimelate (70.0) and trimethylol propane (10.0).<br>2, 3, 4 and 5. Same as in Example 8 | Poly-$\gamma$-methyl-D-glutamate (M.W. 420,000).<br>Do. |

A comparison between the adhesives of the present invention and adhesives conventionally used for polyolefin films, as in U.S. Pat. 3,198,692 of Bridgeford, has been carried out in order to show the superiority of the present adhesives for use with polyglutamic acid coatings. The results are shown in the following description.

Characteristics of adhesives used:

(a) Adhesives for polyolefin (comparison):
  (A) Bond CD 1001 (trade name of Kabushiki Kaisha Konishi Giske Shohten, Japan)
    Principal component: Modified rubber latex
    Non-volatile substance: 50–53%
    Solvent: Water
    Viscosity: 1,500–3,000 cps.
  (B) Bond H 12 (trade name of Kabushiki Kaisha Konishi Giske Shohten, Japan)
    Principal component: Synthetic rubber
    Non-volatile substance: 22–24%
    Viscosity: 10,000–20,000 cps.

(b) The adhesives of the present invention
  (C) Adhesive (C)
    Principal component: Urethane adduct consisting of an adduct of lysine isocyanate methyl ester and trimethylolpropane and a polyol consisting essentially of propylene glycol (molecular weight: about 3,000)
    Non-volatile substance: 40–50%
    Solvent: Cellosolve acetate-xylene
    Viscosity: 10,000– 25,000 cps.
  (D) Adhesive (D)
    Principal component: Urethane adduct consisting of lysine isocyanate methyl ester, a polyol consisting essentially of polypropylene glycol (molecular weight: about 400) and trimethylolprone
    Non-volatile substance: 40–50%
    Solvent: Cellosolve acetate-xylene-ethane dichloride
    Viscosity: 5,000–20,000 cps.

(I) The above four adhesives were each coated on a separate cotton suede in a proportion of about 20–30 g. (as resin)/m.², and a layer of poly-$\gamma$-methyl-L-glutamate having a molecular weight of about 200,000 was then applied thereon in a thickness of about 0.02 mm. by a conventional method to form a synthetic leather. When comparing the finished shape of the poly-$\gamma$-methyl-L- glutamate film on the surface of the resultant synthetic leather, the degree of softness of the respective synthetic leathers was as follows:

$$(B) < (A) < (C) < (D)$$

Hence, the leather-like materials obtained using conventional polyolefin adhesives are inferior to the synthetic leathers obtained using the adhesives of the present invention.

(II) The following are comparative data obtained by the cantilever method at 45° C. (the smaller the figure, the softer the leather):

|  | Cm. |
|---|---|
| Synthetic leather obtained using adhesive (A) | 14.5 |
| Base fabric alone | 9.0 |
| Synthetic leather obtained using adhesive (B) | ¹15 |
| Synthetic leather obtained using adhesive (C) | 14.0 |
| Synthetic leather obtained using adhesive (D) | 13.5 |

¹ Or more.

(III) The resulting synthetic leathers were also subjected to an embossing procedure by means of a heated roller (surface temperature: about 100°–180° C.) to form a pattern on the surface of the leather. In the case of the leathers obtained by the use of adhesives (A) and (B), the base fabric was separated from the poly-γ-methyl-L-glutamate layer and, hence, embossing was impossible. On the other hand, in the case of the leathers obtained by the use of adhesives (C) and (D), beautiful patterns were formed on the surface by embossing, giving excellent synthetic leather products.

(IV) In addition, the degrees of coloration of the coated product produced using adhesives (A), (B) and (C), when exposed in a Weather-O-Meter having a xenon light source for 100 hours, were as follows:

$$(A) \approx (B) \gg (C)$$

Accordingly, it can be seen that the coated products obtained by the use of the adhesives of the present invention have a low degree of coloration and, hence, an excellent resistance to light.

(V) The following results were obtained with tests carried out with a Scott-type folding and abrading tester under a load of 1 kg.:

(A) Peeled off and broken at 2,000 times.
(B) Peeled off and broken at 2,000 times.
(C) Peeled off and broken at 5,000 times.

Hence, it can be seen that the synthetic leather composite of the present invention has excellent advantages over the products of the prior art with respect to properties such as adhesiveness, gloss, light resistance, softness and feel, embossability, etc., a well as an enhancement of the elongation thereof, the latter particularly when an acidic amino acid derivative is incorporated into the polyglutamate.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A leather-like composite comprising (1) a substrate coated with (2) a polymer of a glutamic acid-γ-ester or a blend of at least two glutamic acid-γ-ester polymers, said glutamic acid-γ-ester having the formula:

$$\begin{array}{ccc} \text{COOR}_4 & \text{COO—R}_5\text{—OOC} \\ | & | \quad\quad\quad | \\ (\text{CH}_2)_2 & (\text{CH}_2)_2 \quad (\text{CH}_2)_2 \\ | & \text{or} \quad | \quad\quad\quad | \\ \text{CHNH}_2 & \text{CHNH}_2 \quad \text{CHNH}_2 \\ | & | \quad\quad\quad | \\ \text{COOH} & \text{COOH} \quad\quad \text{COOH} \end{array}$$

wherein $R_4$ is a monovalent hydrocarbon group selected from the group consisting of saturated and unsaturated aliphatic hydrocarbon residues having from 1 to 20 carbon atoms; saturated and unsaturated cycloaliphatic hydrocarbon residues having from 4 to 20 carbon atoms; aryl, alkaryl, aralkyl and aralkenyl hydrocarbon residues having from 6 to 20 carbon atoms; and derivatives thereof having at least one substituent selected from the group consisting of chloro, bromo, fluoro, nitro, cyano, alkoxy, carboalkoxy, carboaryloxy, carboalkaryloxy, carboaralkoxy, carboaralkoxy, mono- and dialkylated amino, acylated amino, carboalkoxy amino and carboaralkoxyamino and $R_5$ is a divalent hydrocarbon group selected from the group consisting of the same hydrocarbon residues and derivatives thereof as said $R_4$, and (3a) an adhesive for the polymer and disposed between the polymer and the substrate, said adhesive comprising as the principal constituent a compound selected from the group consisting of diisocyanato-substituted aliphatic carboxylic acid esters having the formula:

$$\begin{array}{c} \text{NCO} \quad \text{NCO} \quad \text{O} \\ | \quad\quad | \quad\quad \| \\ R_3\text{—C—R}_2\text{—C—C} \\ | \quad\quad | \quad\quad \backslash \\ \text{H} \quad\quad \text{H} \quad\quad \text{OR}_1 \end{array}$$

whrein $R_1$ is alkyl, alkoxyalkyl, cycloalkyl, aryl, alkaryl or aralkyl or a derivative thereof having at least one substituent selected from the group consisting of chloro, bromo, fluoro, nitro, alkoxy, carboalkoxy, acylamino, dialkylamino, carboalkoxyamino and carboaralkoxyamino, $R_2$ is alkylene or alkylidene and $R_3$ is hydrogen or $$\begin{array}{c} \text{O} \\ \| \\ \text{—C—O—Y} \end{array}$$

wherein Y is selected from the same group as $R_1$, or (3b) the reaction product of the diisocyanate compound with a polyol in sufficient quantities to give an NCO/OH ratio of from 0.1 to 10.0.

2. A leather-like composite in accordance with claim 1, wherein said substrate is selected from the group consisting of woven fabrics, knitted fabrics and non-woven fabrics, made of from polyamide fibers, polyester fibers, polyacrylonitrile fibers, polyvinyl chloride fibers, rayon fibers, cotton fibers, silk fibers, wool fibers, linen fibers, or cellulose acetate fibers, and said fabrics having been coated with a synthetic resin comprising polyamide resin, a polyurethane resin, a polyester resin or a polyvinyl chloride resin.

3. A leather-like composite in accordance with claim 1, wherein said substrate is cotton.

4. A leather-like composite in accordance with claim 1, wherein the $R_1$, $R_4$ and Y are selected from the group consisting of methyl, ethyl, n-propyl, i-propyl, n-butyl and isomers thereof, n-pentyl and isomers thereof, n-hexyl and isomers thereof, n-heptyl and isomers thereof, n-octyl and isomers thereof, n-decyl and isomers thereof, n-dodecyl(aluryl) and isomers thereof, cetyl, stearyl, oleyl, cyclobutyl, cyclopentyl, cyclohexyl, cycloheptyl, cyclooctyl, cyclobutylmethyl, cyclopentylmethyl, cyclohexylmethyl, cyclooctylmethyl, methylcyclohexyl, phenyl, o-tolyl, p-tolyl, benzyl, β-phenylethyl, p-tolylmethyl, o-tolylmethyl, o-(2-chlorotolyl), methoxymethyl, ethoxymethyl, 2-nitroethyl, 2-chloroethyl, 2-bromoethyl, 2-fluoroethyl, 2-cyanoethyl, 2-chloropropyl, 3-chloropropyl, 1,2-dichloropropyl, 2,3-dichloropropyl, 3-bromopropyl, vinyl, allyl, crotyl, p-chlorobenzyl, p-bromobenzyl, p-fluorobenzyl, p-nitrobenzyl, p-cyanobenzyl, p-methoxybenzyl, o-carboethoxybenzyl, p-carboethoxybenzyl, p-carbomethoxybenzyl, pentachlorobenzyl, o - methoxybenzyl, o- and p-ethoxybenzyl, o- and p-methoxyphenyl, p-chlorophenyl, p-nitrophenyl, pentachlorophenyl, p-carbomethoxyphenyl, p-(N-methylaminophenyl), p-(N-ethylaminophenyl), p-(N,N-dimethylaminophenyl), p-(N,N-diethylaminophenyl), p-(N-methyl-N-ethylaminophenyl), p-(N-methylaminobenzyl), p-(N-acetylaminophenyl), p-(N-acetylaminobenzyl), p-(N-carbomethoxyaminophenyl), p-(N-carbomethoxyaminobenzyl), β-(dimethylaminoethyl), β-(carboethoxyethyl), p-(N-carbobenzoxyaminophenyl), 2-methoxyethyl, 2-ethoxyethyl, 3- methoxypropyl, 3-ethoxypropyl, 3-butoxypropyl, 4-methoxybutyl, 4-ethoxybutyl and 2-butoxyethyl, the $R_2$ is selected from the group consisting of methylene, ethylene, propylene, trimethylene, butylene, tetramethylene, pentylene, pentamethylene, hexylene and hexamethylene, the $R_3$ is selected from the group consisting of hydrogen and —COOY and the $R_5$ is selected from the group consisting of ethylene, propylene, butylene, trimethylene, tetramethylene, pentamethylene, hexamethylene, 2-butenylene, cyclopentylene, cyclohexylene, cyclohexenylene, p-phenylene and residues derived from p-di(hydroxymethyl)benzene, p-di(hydroxymethyl)cyclohexane, diethylene glycol and dipropylene glycol.

5. A leather-like composite in accordance with claim 1, wherein the diisocyanate compound is selected from the group consisting of the methyl, ethyl, propyl, butyl, octyl, lauryl and stearyl esters of 2,5-diisocyanato valeric acid or 2,6-diisocyanato caproic acid.

6. A leather-like composite in accordance with claim 1, wherein said γ-ester group is selected from the group consisting of methyl, ethyl, n-propyl, i-propyl, n-butyl and isomers thereof, n-pentyl and isomers thereof, n-hexyl and isomers thereof, n-heptyl and isomers thereof, n-octyl and isomers thereof, n-decyl and isomers thereof, n-dodecyl (lauryl) and isomers thereof, cetyl, stearyl, oleyl, cyclobutyl, cyclopentyl, cyclohexyl, cycloheptyl, cyclooctyl, cyclobutylmethyl, cyclopentylmethyl, cyclohexylmethyl, cyclooctylmethyl, methylcyclohexyl, phenyl, o-tolyl, p-tolyl, benzyl, β-phenylethyl, p-tolylmethyl, o-tolylmethyl, o-(2-chlorotolyl), methoxymethyl, ethoxymethyl, 2-nitroethyl, 2-chloroethyl, 2-bromoethyl, 2-fluoroethyl, 2-cyanoethyl, 2-chloropropyl, 3-chloropropyl, 1,2-dichloropropyl, 2,3-dichloropropyl, 3-bromopropyl, vinyl, allyl, crotyl, p-chlorobenzyl, p-bromobenzyl, p-fluorobenzyl, p-nitrobenzyl, p-cyanobenzyl, p-methoxybenzyl, o-carboethoxybenzyl, p-carboethoxybenzyl, p - carbomethoxybenzyl, pentachlorobenzyl, o-methoxybenzyl, o- and p-ethoxybenzyl, o- and p-methoxyphenyl, p-chlorophenyl, p-nitrophenyl, pentachlorophenyl, p-carbomethoxyphenyl, p-(N-methylaminophenyl), p-(N-ethylaminophenyl), p-(N,N-dimethylaminophenyl), p - (N,N - diethylaminophenyl), p-(N-methyl - N - ethylaminophenyl), p-(N-methylaminobenzyl), p-(N-acetylaminophenyl), p-(N-acetylaminobenzyl), p - (N-carbomethoxyaminophenyl), p-(N-carbomethoxyaminobenzyl), β - (dimethylaminoethyl), β-(carboethoxyethyl), p-(N-carbobenzoxyaminophenyl), 2-methoxyethyl, 2-ethoxyethyl, 3-methoxypropyl, 3-ethoxypropyl, 3-butoxypropyl, 4-methoxybutyl, 4-ethoxybutyl, 2-butoxyethyl, ethylene, propylene, butylene, trimethylene, tetramethylene, pentamethylene, hexamethylene, 2-butenylene, cyclopentylene, cyclohexylene, cyclohexenylene, p-phenylene and residues derived from p - di(hydroxymethyl)benzene, p - di(hydroxymethyl)cyclohexane, diethylene glycol and dipropylene glycol.

7. A leather-like composite in accordance with claim 1, wherein said polymer comprises a copolymer of said glutamic acid-γ-ester and a moiety of a neutral amino acid, an ω-monoester of an acidic amino acid, an $N^\omega$-substituted basic amino acid or a derivative thereof.

8. A leather-like composite in accordance with claim 7, wherein the moiety copolymerized with said glutamic acid-γ-ester is selected from the group consisting of glycine, alanine, α-aminobutyric acid, valine, norvaline, leucine, isoleucine, norleucine, phenylalanine, O-substituted serine, O-substituted homoserine, O-substituted threonine, S-substituted cysteine, cystine, methionine, aspartic acid-β-monoester, α-aminoadipic acid-δ-monoester, $N^{im}$-substituted histidine, proline, $N^\delta$-substituted ornithine, $N^\epsilon$-substituted lysine and $N^{guanido}$-substituted arginine.

9. A leather-like composite in accordance with claim 1, wherein said polymer is selected from the group consisting of poly-γ-methyl-glutamate, poly-γ-ethyl-glutamate, poly-γ-(i-propyl)-glutamate, poly-γ-(n-propyl)-glutamate, poly-γ-(n-butyl)-glutamate, poly-γ-(i-, sec- and t-butyl)-glutamate, poly-γ-benzyl-glutamate, polyamide polymers of $O^1,O^2$-di-(γ-glutamyl)-ethylene glycol, copoly-γ-methyl glutamate-γ-ethyl glutamate, copoly-γ-methyl glutamate-γ-(n-propyl) glutamate, copoly-γ-methyl glutamate-γ-(n-butyl) glutamate, copoly - γ - methyl glutamate-γ-benzyl glutamate, copoly-γ-methyl glutamate-alanine, copoly-γ-methyl glutamate-$N^\epsilon$-acetyllysine, copoly-γ-methyl glutamate-methionine, copoly-γ-methyl glutamate-γ-ethyl glutamate-γ-(n-propyl) glutamate, copoly-γ-methyl glutamate-γ-ethyl glutamate-γ-(i-propyl) glutamate, copoly-γ-methyl glutamate-γ-ethyl glutamate-γ-butyl glutamate, copoly-γ-methyl glutamate-alanine-methionine, copoly-γ-methyl glutamate-$O^1,O^2$-di(γ-glutamyl) ethylene glycol-γ-(i-propyl) glutamate, blend polymers of poly-γ-methyl glutamate and poly-γ-ethyl glutamate, blend polymers of poly-γ-methyl glutamate and poly-γ-(n-propyl) glutamate, blend polymers of poly-γ-methyl glutamate and poly-γ-(i-propyl) glutamate, blend polymers of poly-γ-methyl glutamate and poly-γ-(n-butyl) glutamate, blend polymers of poly-γ-methyl glutamate, poly-γ-ethyl glutamate and poly-γ-(n-butyl) glutamate, blend polymers of poly-γ-methyl glutamate and poly-γ-benzyl glutamate, blend polymers of poly-γ-methyl glutamate and polyalanine, blend polymers of poly-γ-methyl glutamate, poly-γ-ethyl glutamate and polyalanine, blend polymers of poly-γ-methyl glutamate and poly-$N^\epsilon$-acetyllysine, blend polymers of poly-γ-methyl glutamate, polyamide polymers of $O^1,O^2$-di(γ-glutamyl) ethylene glycol and polyalanine, blend polymers of poly-γ-methyl glutamate, polyamide polymers of $O^1,O^3$-di(γ-glutamyl) trimethylene glycol and poly-γ-butyl glutamate, blend polymers of poly-γ-methyl glutamate, polyalanine and polymethionine, blend polymers of poly-γ-methyl glutamate and polymethionine, blend polymers of poly-γ-methyl glutamate, polyalanine and poly-$N^\epsilon$-acetyllysine, blend polymers of poly-γ-ethyl glutamate and poly-γ-(n-butyl) glutamate, blend polymers of poly-γ-ethyl glutamate and poly-γ-(n-butyl) glutamate, blend polymers of poly-γ-ethyl glutamate and poly-γ-(n-propyl) glutamate, blend polymers of poly-γ-ethyl glutamate and poly-γ-(i-propyl) glutamate, blend polymers of poly-γ-ethyl glutamate and polyalanine, blend polymers of poly-γ-ethyl glutamate and poly-$N^\epsilon$-acetyllysine and blend polymers of poly-γ-ethyl glutamate and polymethionine.

10. A leather-like composite in accordance with claim 1, wherein said polymer contains a plasticizer therefor.

11. A leather-like composite in accordance with claim 10, wherein said plasticizer is a diester of an acidic amino acid or an N-substituted derivative thereof.

12. A leather-like composite in accordance with claim 1, wherein said copolymer contains a color-producing material.

13. A leather-like composite in accordance with claim 1, wherein the substrate is a woven or nonwoven fabric.

14. A leather-like composite in accordance with claim 1, wherein said adhesive includes a material selected from the group consisting of diols, polyols, polyol polyesters and acrylic-modified polyols.

15. A leather-like composite in accordance with claim 1, wherein said adhesive includes a polyol, the ratio of the polyol to the diisocyanate compound being about 0.5 to 3.0.

16. A leather-like composite comprising (1) a cotton suede substrate coated with (2) a polymer of a glutamic acid-γ-ester or a blend of at least two glutamic acid-γ-ester polymers and (3a) an adhesive for the polymer and disposed between the polymer and the substrate, said adhesive comprising as the principal constituent a diisocyanato-substituted aliphatic carboxylic acid ester or (3b) the reaction product of the diisocyanate compound with a polyol in sufficient quantities to give an NCO/OH ratio of from 0.1 to 10.0.

17. A leather-like composite in accordance with claim 16, wherein said adhesive is a diisocyanate compound having the formula:

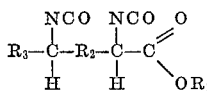

wherein $R_1$ is an organic moiety, $R_2$ is alkylene or alkylidene and $R_3$ is hydrogen or

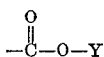

Y being an organic moiety.

18. A leather-like composite in accordance with claim 17, wherein $R_1$ and Y are alkyl, alkoxyalkyl, cycloalkyl, aryl, alkaryl or aralkyl or a derivative thereof having at least one substituent selected from the group consisting of chloro, bromo, fluoro, nitro, alkoxy, carboalkoxy, acylamino, dialkylamino, carboalkoxyamino and carboaralkoxyamino.

19. A leather-like composite in accordance with claim 18, wherein the NCO/OH ratio in said adhesive is about 0.5 to 3.0.

20. A leather-like composite in accordance with claim 17, wherein the curing temperature of said diisocyanate compound is about room temperature to about 180° C.

References Cited

UNITED STATES PATENTS

| | | | |
|---|---|---|---|
| 3,582,397 | 6/1971 | Shibata | 260—78 A |
| 3,537,871 | 11/1970 | Kaneko | 117—76 T |
| 3,582,442 | 6/1971 | Kaneko | 161—190 |
| 3,356,650 | 12/1967 | McElroy | 161—190 |
| 3,422,165 | 1/1969 | Brotherton et al. | 161—190 |
| 3,371,069 | 2/1968 | Miyamao et al. | 260—78 A |
| 3,475,386 | 10/1969 | Meigs et al. | 260—78 A |

WILLIAM A. POWELL, Primary Examiner

G. W. MOXON II, Assistant Examiner

U.S. Cl. X.R.

117—76 T, 140 A, 161 KP, 161 UN; 161—170, 190, 227, Dig. 2